US008691029B2

(12) United States Patent
Kiser

(10) Patent No.: US 8,691,029 B2
(45) Date of Patent: Apr. 8, 2014

(54) REDUCED FERRITE STEEL LINER

(75) Inventor: Matthew T. Kiser, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 341 days.

(21) Appl. No.: 13/036,249

(22) Filed: Feb. 28, 2011

(65) Prior Publication Data

US 2011/0212340 A1 Sep. 1, 2011

Related U.S. Application Data

(60) Provisional application No. 61/308,485, filed on Feb. 26, 2010.

(51) Int. Cl.
*C22C 38/00* (2006.01)
*B23P 15/10* (2006.01)

(52) U.S. Cl.
USPC ........................................ 148/320; 29/888.04

(58) Field of Classification Search
USPC ............ 148/320; 428/563; 29/888.04, 888.07
See application file for complete search history.

(56) References Cited

U.S. PATENT DOCUMENTS

2005/0199196 A1 9/2005 Azevedo et al.

FOREIGN PATENT DOCUMENTS

JP 08218123 A * 8/1996

OTHER PUBLICATIONS

Tanaka et al., English machine translation of JP 08-218123, Aug. 1996, p. 1-5.*

Bramfitt, Bruce L., "Role of Microstructure", Metals Handbook, 2002, ASM International, p. 1-30.*

* cited by examiner

*Primary Examiner* — Roy King
*Assistant Examiner* — Caitlin Kiechle
(74) *Attorney, Agent, or Firm* — Miller, Matthias & Hull

(57) ABSTRACT

A steel liner with a case comprising at least 95% martensite, such as substantially 100% martensite, and a core comprising pearlite and discrete ferrite grains decorating former austenite grain boundaries. The ferrite in the liner's core has an average size of less than about 25 μm.

19 Claims, 4 Drawing Sheets

REDUCED FERRITE STEEL LINER

CROSS-REFERENCE TO RELATED PATENT APPLICATIONS

This application claims priority to provisional U.S. Patent Application Ser. No. 61/308,485, filed Feb. 26, 2010, entitled "Reduced Ferrite Steel Liner", the entire disclosure of which is incorporated herein by reference.

TECHNICAL FIELD

This disclosure relates generally to a steel cylinder liner for an internal combustion engine; more particularly, to a steel cylinder liner having a reduced ferrite concentration and including of an inner layer of martensite and a substrate of pearlite with ferrite decorating former austenite boundaries.

BACKGROUND

Diesel engines typically employ replaceable cylinder liners made of various grades of cast iron, such as grey iron. Cast iron is selected, in part, because graphite at the interface between the liner and a piston ring acts as a lubricant and provides wear resistance. Heat treating the surface of cast iron alloys may also increase wear resistance by forming a hard, martensitic microstructure.

Further, engineers are designing thinner liners in an effort to increase the displacement of the cylinders to extract more power from the engine. However, thinned grey iron liners may not have sufficient strength properties, leading to flange fatigue and eventual structural failure of the liners. Accordingly, another material was examined for such thin liner applications.

One category of material that has been explored is steel alloys, since they provide improved strength and creep resistance. An exemplary application of steel liners is discussed by Azevedo et al. (U.S. Pat. App. Pub. 2005/0199196). However, Azevedo et al. note that steel liners are not suitable for use in heavy-duty wet lined engine applications, and propose to solve that issue. In dry lined applications, the surface of a steel liner must be hardened to nearly completely martensitic structure on the wear surface. But creating a specific microstructure in steel liners is highly dependent on the processing techniques, and primarily on the heat treatments employed. For example, the typical combination of a furnace cool from normalizing temperatures results in a lamellar structure and is, appropriately, called a lamellar anneal. The lamellar structure includes large grains of pearlite and ferrite, which form during the slow furnace cooling, and large regions or bands of ferrite. Subsequent induction hardening heat treatment(s) can quickly dissolve the pearlite, but large domains of ferrite may persist even after two induction hardening heat treatments because of insufficient time for ferrite dissolution. These large domains of ferrite artifacts may inhibit the performance of the steel liner by potentially promoting cyclic creep in the liner, resulting in ovalization and, eventually, seizure of the piston. Moreover, even without ovalization, the soft ferrite domains may lead to piston seizure because of their low scuffing resistance.

The present disclosure is directed to overcoming one or more of the problems as set forth above.

SUMMARY

In one aspect of the present disclosure, a steel piston liner comprising a cylindrical, hollow steel body including a case that is at least 95% martensite and a core that includes pearlite with discrete ferrite grains decorating former austenite boundaries is disclosed. The ferrite in the core has an average grain size of less than about 25 μm.

In another aspect of the present disclosure, a steel piston liner comprising a cylindrical, hollow steel body including a case that is substantially 100% martensite and a core that includes pearlite with discrete ferrite grains decorating former austenite boundaries is disclosed. The ferrite in the core has an average grain size of less than about 25 μm and the steel piston liner of claim 1 wherein the case depth is between about 0.1 and about 0.7 mm. Further, the steel piston liner of claim 1 wherein the case has a hardness of at least about 57 HRC over at least about 98% of the surface area of the case.

DETAILED DESCRIPTION

Figure 1:
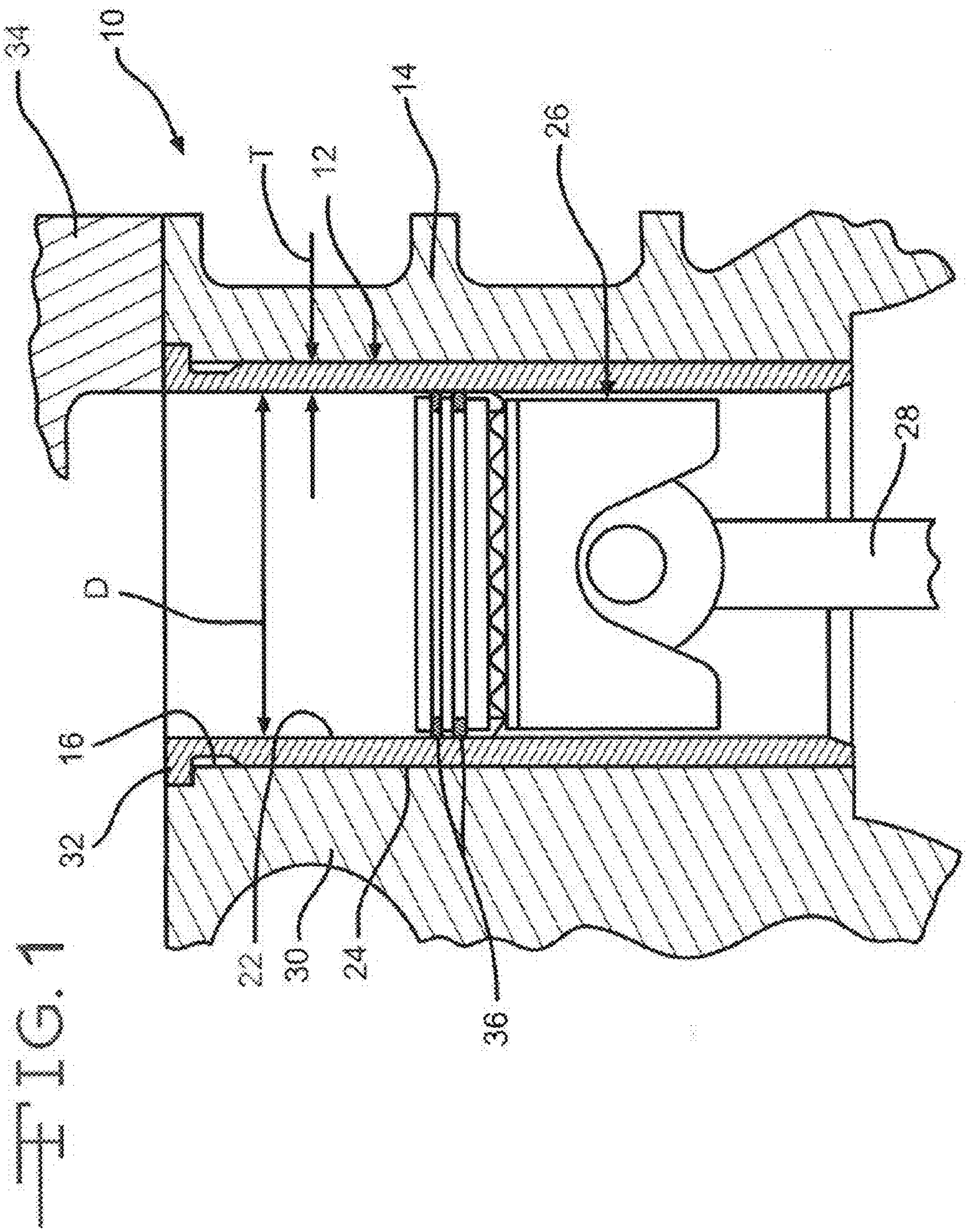
FIG. 1 is a cross-sectional illustration of a steel liner in an engine cylinder according to the present disclosure.
Figure 2:
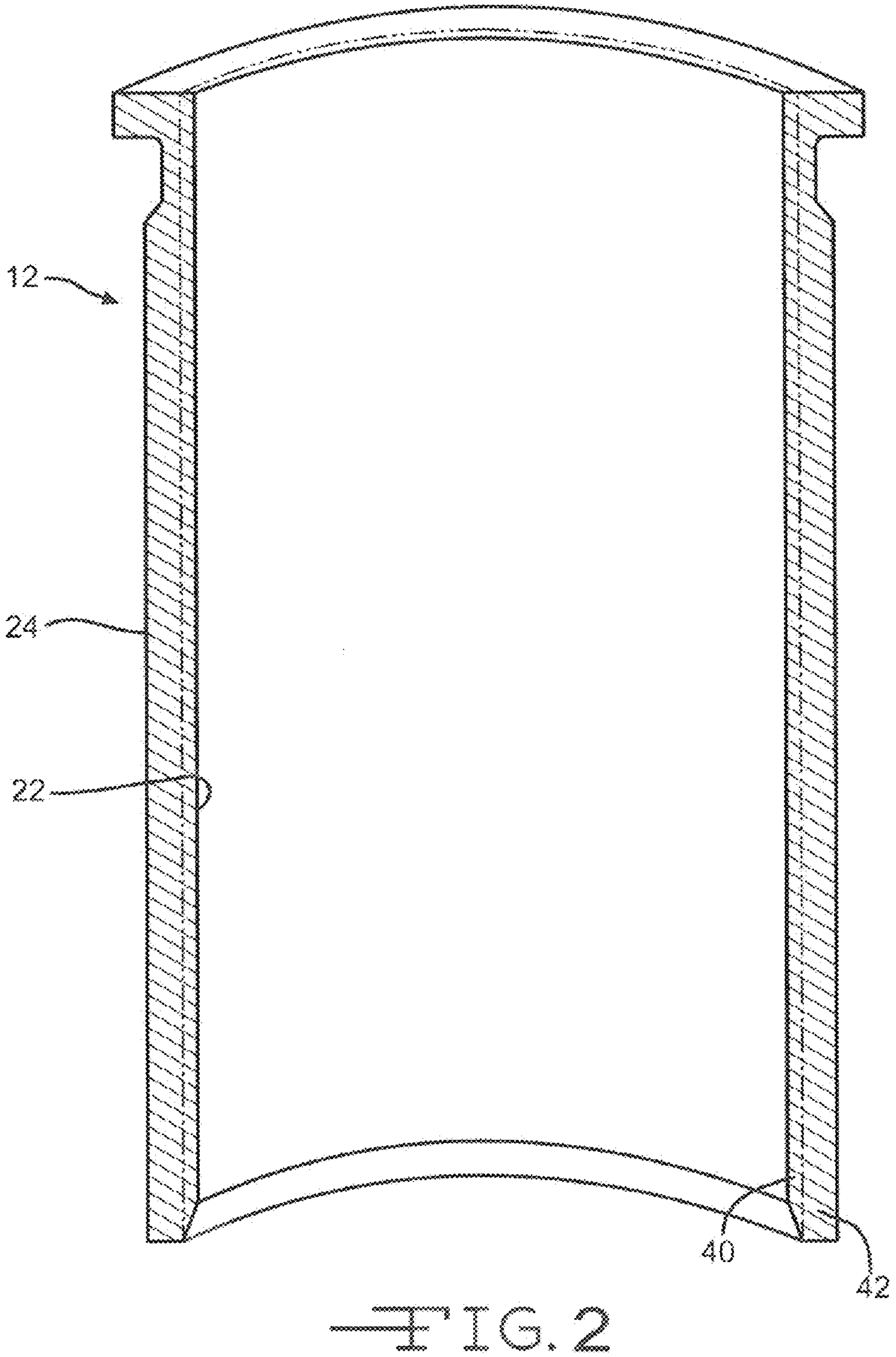
FIG. 2 is a perspective cross-sectional view of the steel liner according to the present disclosure.

Referring to the drawings, FIG. 1 is a cross-sectional view of part of an engine 10 with a steel liner 12. Engine 10 includes an engine block 14 comprising a piston bore 16, within which liner 12 is removably mounted. Liner 12 has a generally cylindrical body having a thickness, T, an inner diameter, D, and is hollow or open-ended. Liner 12 presents an inner running surface 22 and an outer surface 24. A piston 26 is housed in liner 12 and is operatively coupled to a crank (not shown) via a connecting rod 28, which drives piston 30 in a reciprocating motion within liner 12, as is well known in the art. Engine block 14 may be formed with a water jacket cavity in open communication with piston bore 16, or as shown in FIG. 1, outer surface 24 of liner 12 may be in direct contact with bore 16. Liner 12 also may have a top flange 32 at the top end of the liner that is mated to an annular mounting face of a step formed in engine block 14. Alternatively, the liner may be any known configuration that is suitable for use with a piston and bore, such as a press-fit liner. As shown in FIG. 2, the liner 12 may also be described to include a case 40, which is a hardened portion extending radially from the inner running surface 22 to a depth within the liner, and a core 42, which is the remainder of the liner other than the case 40.

Figure 4:
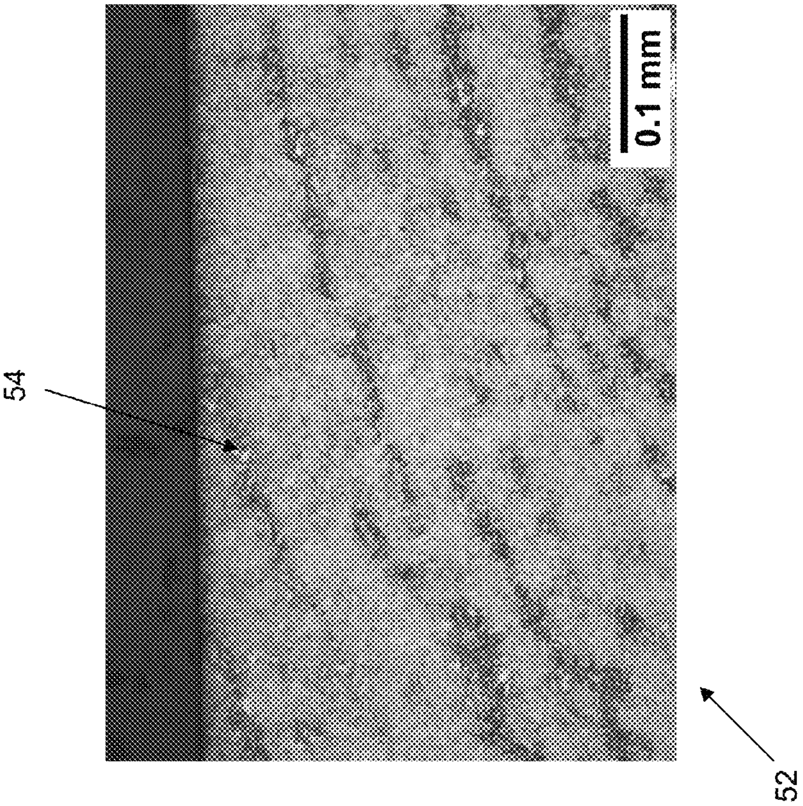
FIG. 4 is a microphotograph at 200× magnification of the microstructure at the inner diameter surface of a prior art steel liner after induction hardening.
Figure 3:
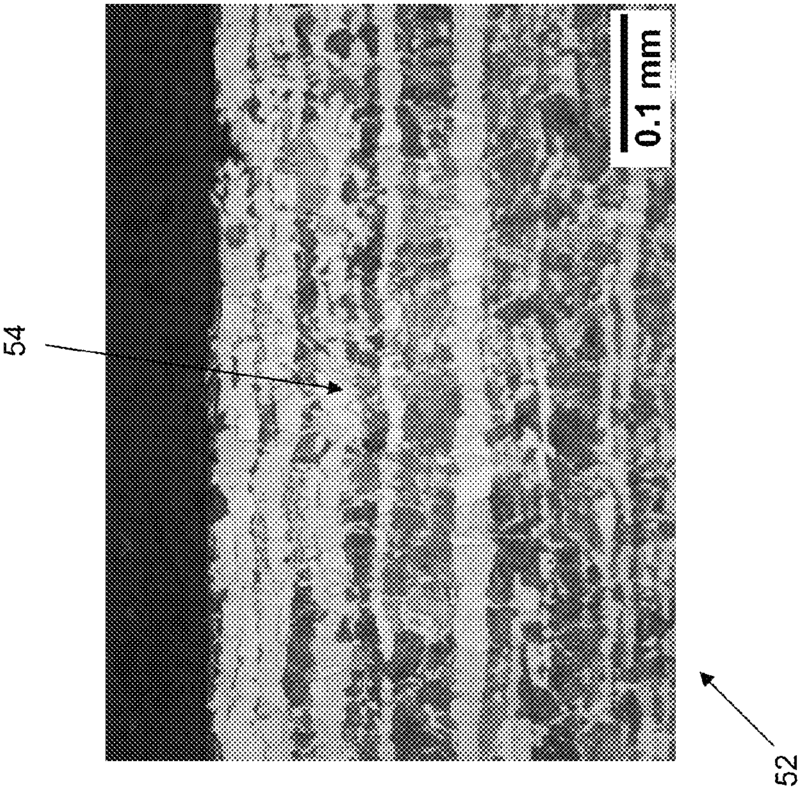
FIG. 3 is a microphotograph at 200× magnification of the microstructure at the inner diameter surface of a prior art steel liner prior to induction hardening.

FIGS. 3 and 4 illustrate the microstructure of a prior art steel liner 52. The prior art liner 52 is formed by a process that includes a lamellar anneal when the steel is being initially processed after initial forming the tube from a wrought steel bar and before cold drawing. The steel then undergoes an induction hardening process after cutting, but before the inner diameter is honed. The resulting liner 52, prior to the induction hardening process, has a microstructure that is characterized by large bands of ferrite grains 54, shown as "light" areas in FIG. 3. As a result, even after two induction hardening anneals, the liner 52 still includes undissolved ferrite 54 as shown in FIG. 4.

To form the liner 12, the lamellar annealing step is replaced by a normalized step. In particular, the normalizing heat treat comprises heating the steel to between about 900° C. and about 950° C. for at least about 10 minutes, after which the steel is cooled via, e.g., air cooling or some other acceptable cooling technique. Further, the induction hardening heat treatment step comprises heating a localized portion of the inner diameter of the normalized steel liner to above about 800° C., followed by a water quench, then a temper at between about 150° C. and about 170° C.

Figure 5:
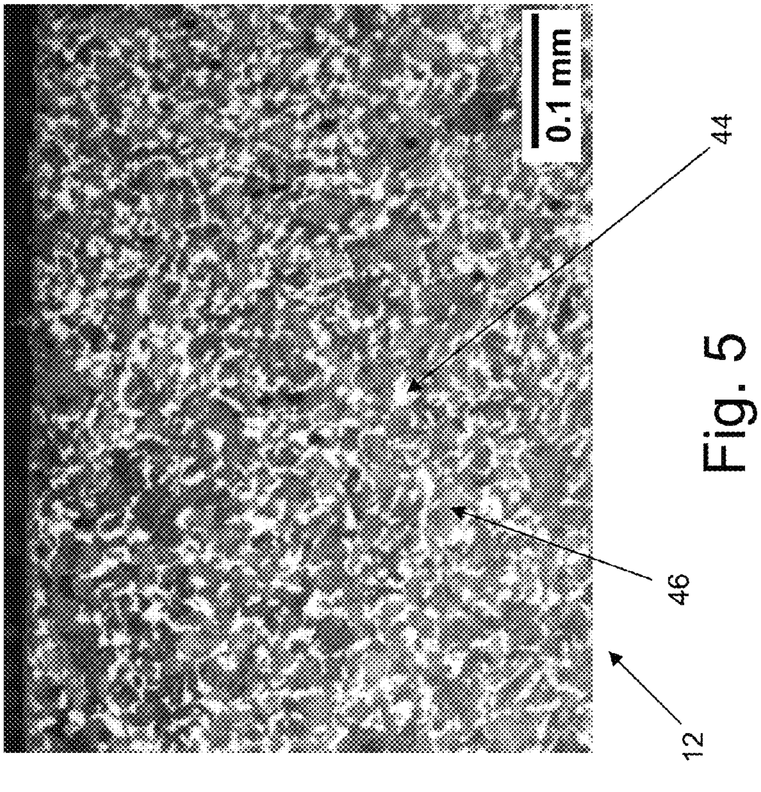
FIG. 5 is a microphotograph at 200× magnification of the microstructure at the inner diameter surface of a steel liner formed according to the present disclosure prior to induction hardening.

As a result, liner 12 comprises a lower fraction of ferrite grains 44, which also are smaller and more discrete than with the lamellar anneal. In particular, as shown in FIG. 5, the process yields ferrite grains 44 with an average size of less than about 25 μm, such as less than 20 μm or even less than 10 μm. By comparison, the prior art liner 52, formed with the lamellar anneal process, results in ferrite grains 54 with an average size of about 28 μm or greater. Also, the disclosed normalized anneal process reconfigures the distribution of ferrite grains such that large bands of ferrite that are hard to dissolve do not form, as is the case when a lamellar anneal process. Rather, the disclosed process forms discrete ferrite grains, which are more easily dissolved, that decorate former austenite grain boundaries. That is, the microstructure can be characterized as being substantially free of bands of ferrite.

Figure 6:
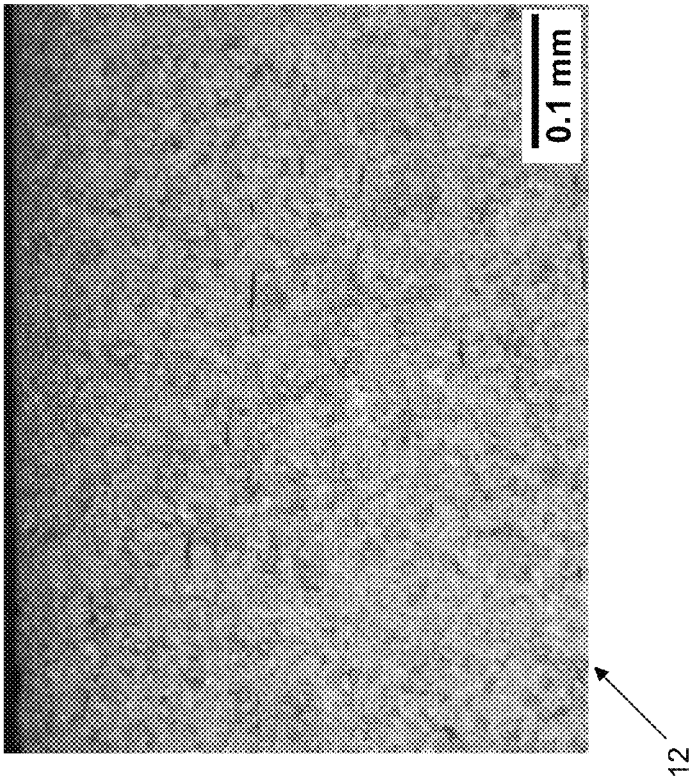
FIG. 6 is a microphotograph at 200× magnification of the microstructure at the inner diameter surface of a steel liner formed according to the present disclosure after induction hardening.

After induction heat treating, the percent volume concentration of ferrite in the liner's case 40 is low enough to be effectively free of undissolved ferrite, as shown in FIG. 6. Specifically, case 40 comprises less than 5 vol % undissolved ferrite, such as less than 3 vol %, or even less than 1 vol %, undissolved ferrite. Any retained ferrite in the case is negligible in size. Thus, the case 40 is an entirely martensitic microstructure. A 100% martensitic microstructure may not be practically feasible, but the case 40 should have a microstructure having substantially 100% martensite throughout, such as at least 95 vol % martensite. For example, the microstructure of case 40 may comprise at least 97 vol %, such as about 99 vol % of martensite.

Such a combination of normalizing heat treatment and induction hardening yields a depth of case 40 of at least 0.1 mm, such as at least 0.5 mm or even at least 1.0 mm. In particular, the case depth of liner 12 is between about 0.1 mm and about 1.5 mm, such as between about 0.1 mm and about 1.0 mm, or even between about 0.1 mm and about 0.7 mm. In some instances, the case depth of liner 12 is between about 0.2 mm and about 0.7 mm, such as between about 0.4 mm and about 0.7 mm.

Moreover, the normalizing heat treat also refines and distributes the pearlite phase in the liner's core 42, which contributes to further impediment of cyclic creep of the liner during operation. More particularly, the microstructure of core 42 comprises pearlite 46 with ferrite grains 44 decorating former austenite grain boundaries (see FIG. 5. in which ferrite is the "light" areas and pearlite is the "dark" areas). Accordingly, core 42 is substantially free of ferrite bands or regions, and the nominal amount of remaining ferrite grains 44 are reduced in size.

The normalizing heat treatment, as compared to the lamellar anneal heat treatment, also reducing the tendency of case 40 to scuff because there is a reduction in the amount of relatively soft, undissolved ferrite phases. The prior art liner 52 was observed to have lower than desired near surface hardness of below 700 HV0.5 and as low as 550 HV0.5. Conversely, the disclosed liner 12, produced with a normalizing heat treat, was observed to have a near surface hardness of 700 HV0.5 or greater, such as in the range of 700 HV0.5 to 750 HV0.5.

The liner 12 is expected to have a hardness of at least about 55 HRC over at least about 90% of the case's surface area. For example, the hardness may be at least about 55 HRC over at least about 95%, or even at least about 98% of the case's surface area. Moreover, the hardness may be at least about 57 HRC over at least about 90%, such as at least about 95% or even at least about 98%, of the case's surface area.

INDUSTRIAL APPLICABILITY

Steel liner 12 of the present disclosure is suitable for use in an engine cylinder, and of particular use in heavy duty diesel engines that could be used for, e.g., construction equipment, marine applications, and electric power generation units. Steel liner 12 may be used in either a wet or dry sleeve setting. The liner 12 may have a variety of inner diameters, D, suited for the particular application in which the liner will be used. For example, the liner may have an inner diameter of about 145 mm.

Further, steel liner 12 may be coated with various specialty coatings on all or a portion of inner running surface 22 to enhance abrasion and/or corrosion resistance. Such coatings may comprise, e.g., chromium, nickel, or alloys formed using thermal spray or laser fusing techniques.

The reduced fraction and/or size of ferrite in liner 12 results in a case 40, after induction hardening, that is substantially 100% martensitic and, thus has sufficient near surface hardness to provide improved scuffing and wear resistance over prior art steel liners. Furthermore, cyclic creep is based on the ease of dislocation mobility through a material, which is significantly higher within the ferrite phase than in either pearlite or martensite microstructures. Therefore, the reduced fraction of ferrite in liner 12 is expected to reduce the tendency of the liner to undergo cyclic creep and deform during operation.

Other aspects can be obtained from a study of the drawings, the specification, and the claims.

What is claimed is:

1. A steel piston liner, comprising:

a cylindrical, hollow steel body, the steel body including a cylindrical inner case disposed concentrically within and connected to a cylindrical outer core, the inner case being at least 95% martensite and the outer core including pearlite with discrete ferrite grains decorating former austenite boundaries, wherein the ferrite in the outer core has an average grain size of less than about 25 μm.

2. The steel piston liner of claim 1 wherein the inner case is substantially 100% martensite.

3. The steel piston liner of claim 1 wherein the inner case includes less than 1 vol % of undissolved ferrite.

4. The steel piston liner of claim 1 wherein the inner case has a thickness of at least about 0.1 mm.

5. The steel piston liner of claim 1 wherein the inner case has a thickness of at least about 0.5 mm.

6. The steel piston liner of claim 1 wherein the inner case has a thickness of at least about 1.0 mm.

7. The steel piston liner of claim 1 wherein the inner case has a thickness of between about 0.1 and about 1.5 mm.

8. The steel piston liner of claim 1 wherein the inner case has a thickness of between about 0.1 and about 1.0 mm.

9. The steel piston liner of claim 1 wherein the inner case has a thickness of between about 0.1 and about 0.7 mm.

10. The steel piston liner of claim 1 wherein the inner case has a hardness of at least 55 HRC over at least 90% of the surface area of the case.

11. The steel piston liner of claim 1 wherein the inner case has a hardness of at least 55 HRC over at least 95% of the surface area of the case.

12. The steel piston liner of claim 1 wherein the inner case has a hardness of at least 55 HRC over at least 98% of the surface area of the case.

13. The steel piston liner of claim 1 wherein the liner has an inner diameter of about 145 mm.

14. The steel piston liner of claim 1 wherein the liner has an inner diameter of about 137 mm.

15. The steel piston liner of claim 1 wherein the ferrite in the outer core has an average grain size of less than 20 μm.

16. The steel piston liner of claim 1 wherein the ferrite in the outer core has an average grain size of less than 10 μm.

17. A steel piston liner, comprising:

a cylindrical, hollow steel body including a cylindrical inner case disposed concentrically within and connected to a cylindrical outer core, the inner case being substantially 100% martensite, the inner case having a radially inner surface having a surface area, the outer core including pearlite with discrete ferrite grains decorating former austenite boundaries;

wherein the ferrite in the outer core has an average grain size of less than 25 μm;

wherein the inner case has a thickness of between about 0.1 and about 0.7 mm; and wherein the inner case has a hardness of at least 55 HRC over at least 95% of the surface area of inner surface the inner case.

18. The steel piston liner of claim 17 wherein the liner has an inner diameter of about 145 mm.

19. The steel piston liner of claim 17 wherein the liner has an inner diameter of about 137 mm.

* * * * *